US012775509B2

(12) United States Patent
Nguyen et al.

(10) Patent No.: US 12,775,509 B2
(45) Date of Patent: Oct. 27, 2026

(54) GENERATING A MODIFIED APPLICATION PROGRAMMING INTERFACE RESPONSE INCLUDING A MODIFIED POINTER ASSOCIATED WITH AN ENCRYPTED VALUE

(71) Applicant: Capital One Services, LLC, McLean, VA (US)

(72) Inventors: Johnny Nguyen, Arlington, TX (US); Mia Frederick, The Colony, TX (US); Pedro Betancourt, McKinney, TX (US); Preetha Veeraraghavan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 478 days.

(21) Appl. No.: 18/466,989

(22) Filed: Sep. 14, 2023

(65) Prior Publication Data

US 2025/0094245 A1 Mar. 20, 2025

(51) Int. Cl.

| | |
|---|---|
| ***G06F 9/54*** | (2006.01) |
| ***G06F 21/60*** | (2013.01) |
| ***H04L 9/08*** | (2006.01) |

(52) U.S. Cl.

CPC ............ *G06F 9/541* (2013.01); *G06F 21/602* (2013.01); *H04L 9/0819* (2013.01)

(58) Field of Classification Search

None

See application file for complete search history.

(56) References Cited

U.S. PATENT DOCUMENTS

| | | | | |
|---|---|---|---|---|
| 9,754,116 | B1 * | 9/2017 | Roth | G06F 21/602 |
| 9,866,539 | B2 * | 1/2018 | Levchenko | G06F 21/6218 |
| 11,562,080 | B2 * | 1/2023 | Sofia | G06F 21/554 |
| 11,977,518 | B2 * | 5/2024 | Natanzon | G06F 21/602 |
| 2006/0075228 | A1 * | 4/2006 | Black | H04L 63/104 713/167 |
| 2022/0350507 | A1 * | 11/2022 | Cleaver | G06F 3/0605 |
| 2023/0350720 | A1 * | 11/2023 | Horgan | G06F 21/602 |

* cited by examiner

*Primary Examiner* — Van H Nguyen

(74) *Attorney, Agent, or Firm* — Harrity & Harrity, LLP

(57) ABSTRACT

In some implementations, a device may receive a first application programming interface (API) response associated with an API request, the first API response comprising an encrypted value and a first pointer associating the encrypted value with a field in the first API response. The device may generate, based on the first API response, a second API response associated with the API request, the second API response comprising the encrypted value and a second pointer that associates the encrypted value with a field in the second API response, wherein the second pointer is different from the first pointer. The device may transmit the second API response.

20 Claims, 6 Drawing Sheets

GENERATING A MODIFIED APPLICATION PROGRAMMING INTERFACE RESPONSE INCLUDING A MODIFIED POINTER ASSOCIATED WITH AN ENCRYPTED VALUE

BACKGROUND

An application programming interface (API) is software interface that enables communication between different applications according to a set of defined rules. In general, an API acts as an intermediary layer that processes data transfers between different systems. For example, an API may act as a bridge to take a request from a first application, translate the request into a format compatible with a second application, and deliver the request to the second application. An API may use various routines, tools, and/or protocols to specify how different software components and/or applications are to function together.

SUMMARY

Some implementations described herein relate to a device for generating a modified application programming interface (API) response including a modified pointer associated with an encrypted value. The device may include one or more memories and one or more processors communicatively coupled to the one or more memories. The one or more processors may be configured to receive an API response associated with an API request, the API response comprising the encrypted value and a pointer associating the encrypted value with a field in a response body of the API response. The one or more processors may be configured to generate, based on the API response, a modified API response associated with the API request, the modified API response comprising the encrypted value and the modified pointer, wherein the modified pointer associates the encrypted value with a field in a response body of the modified API response. The one or more processors may be configured to transmit the modified API response.

Some implementations described herein relate to a method for generating an API response. The method may include receiving, by a device, a first API response associated with an API request, the first API response comprising an encrypted value and a first pointer associating the encrypted value with a field in the first API response. The method may include generating, based on the first API response, a second API response associated with the API request, the second API response comprising the encrypted value and a second pointer that associates the encrypted value with a field in the second API response, wherein the second pointer is different from the first pointer. The method may include transmitting, by the device, the second API response.

Some implementations described herein relate to a non-transitory computer-readable medium that stores a set of instructions. The set of instructions, when executed by one or more processors of a device, may cause the device to receive an API response associated with an API request, the API response comprising a pointer that associates an encrypted value with a field in a response body of the API response. The set of instructions, when executed by one or more processors of the device, may cause the device to transmit a modified API response associated with the API request, wherein the modified API response comprises a renamed pointer that associates the encrypted value with a field in a response body of the modified API response.

DETAILED DESCRIPTION

Figure 1A:
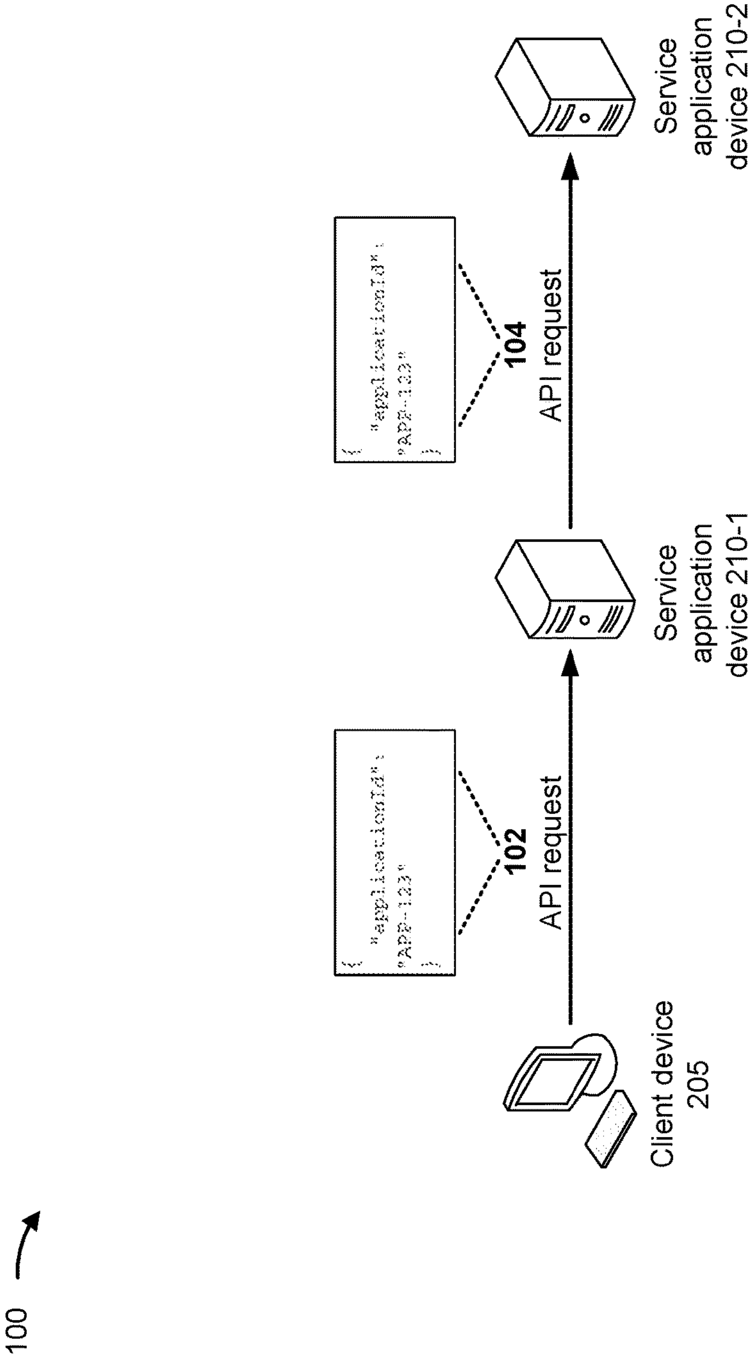
FIGS. 1A-1C are diagrams of an example associated with generating a modified application programming interface (API) response including a modified pointer associated with an encrypted value, in accordance with some embodiments of the present disclosure.

The following detailed description of example implementations refers to the accompanying drawings. The same reference numbers in different drawings may identify the same or similar elements.

A client device may request data from a device that supports a service application (herein referred to as a service application device) via application programming interface (API) associated with the service application device. The service application device may provide the requested data in an API response to the API request. In some scenarios, the data in the API response is encrypted (e.g., via key-based encryption) so as to provide data security (e.g., to prevent the data from being accessed by a malicious actor that obtains the API response). Upon receipt of the API response, the client can decrypt the encrypted data using the appropriate key (e.g., a key configured using an applicable key agreement protocol).

Extending this scenario, the client device may provide an API request to a first service application device (e.g., a device that supports a first service application), and the first service application device may in some cases forward the API request (or provide a second API request) to a second service application device (e.g., a device that supports a second service application). Here, the second service application device may provide encrypted data to the first service application device in an API response. To maintain data security (e.g., to reduce a risk of decrypted data being obtained or accessed by a malicious actor), the client device should be the only device that decrypts the data. In other words, the first service application device should not decrypt the encrypted data received from the second service application device in the API response. However, the first service application device should be permitted to present the encrypted data to the client device in an API response in a manner different than that in which the data is presented in the API response provided by the second service application device. Thus, to enable the first service application device to present the encrypted data to the client device in a desired manner, the first service application device may need to decrypt the encrypted data and then re-encrypt the decrypted data in association with generating an API response that presents data as desired. However, as noted above, decryption and re-encryption compromises data security and, furthermore, is resource intensive (e.g., in terms of processing resources, power resources, or the like) and increases latency associated with providing the API response to the client device.

Some implementations described herein enable generating API responses in a manner that maintains data encryption (e.g., encryption at rest) while increasing API response flexibility to enable data to be presented in a desired manner. In some implementations, the techniques and apparatuses described herein enable generation of a modified API response including a modified pointer associated with an encrypted value. For example, a service application device may receive an API response associated with an API request. Here, the API response may include an encrypted value and a pointer associating the encrypted value with a field in a response body of the API response. In some implementations, the service application device may generate, based on the API response, a modified API response associated with the API request. Here, the modified API response includes the encrypted value and a modified pointer (e.g., modified relative to the pointer in the API response) that associates the encrypted value with a field in a response body of the modified API response. The service application device may then transmit the modified API response. Additional details are provided below.

In some implementations, the techniques and apparatuses described herein reduce resource usage at a service application device in association with providing an API response in a desired manner. Conventionally, to provide data in a desired manner in an API response based on receiving the data in an API response received from another device (e.g., from another service application device), a service application device needs to decrypt the encrypted data and re-encrypt the data. However, in addition to compromising data security, decryption and re-encryption by the service application device increases resource usage (e.g., processor resources, batter power, or the like) and latency at the service application device in association with providing the API response. Notably, the techniques and apparatuses described herein allow the service application device to present the data in a desired manner without a need for data decryption or re-encryption, thereby improving data security while reducing resource consumption and latency at the service application device in association with providing an API response.

Further, the techniques and apparatuses described herein support field-level differentiation of encrypted data and unencrypted data (i.e., data that has not been encrypted) in an API response, meaning that encrypted data and unencrypted data can be included in an API response. Encryption of data at the field-level facilitates remapping of a given field as described herein and, similarly, enables full control of sensitive data (e.g., encrypted data) versus non-sensitive data (e.g., unencrypted data) in the same payload.

Figure 1B:
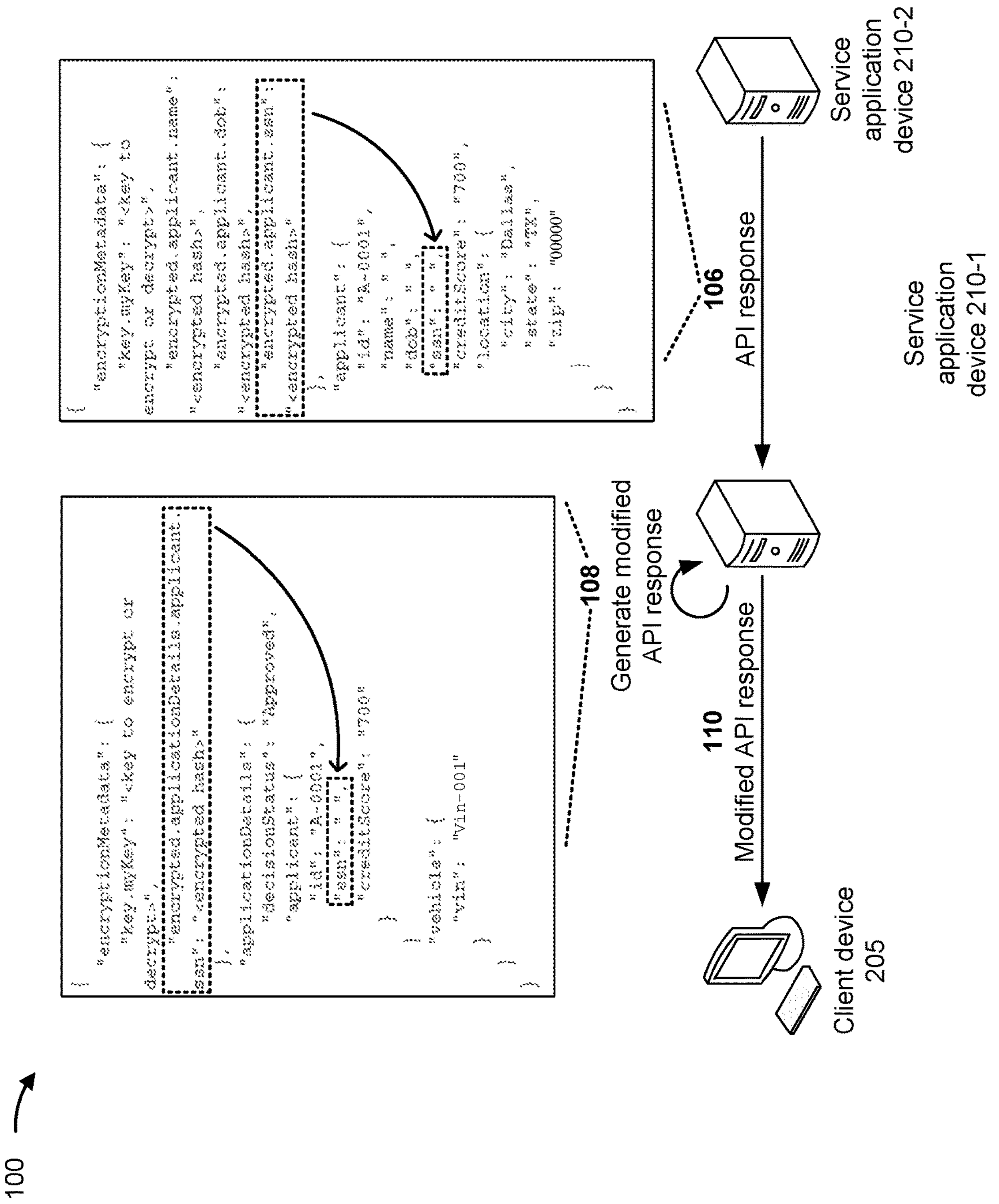
Figure 1C:
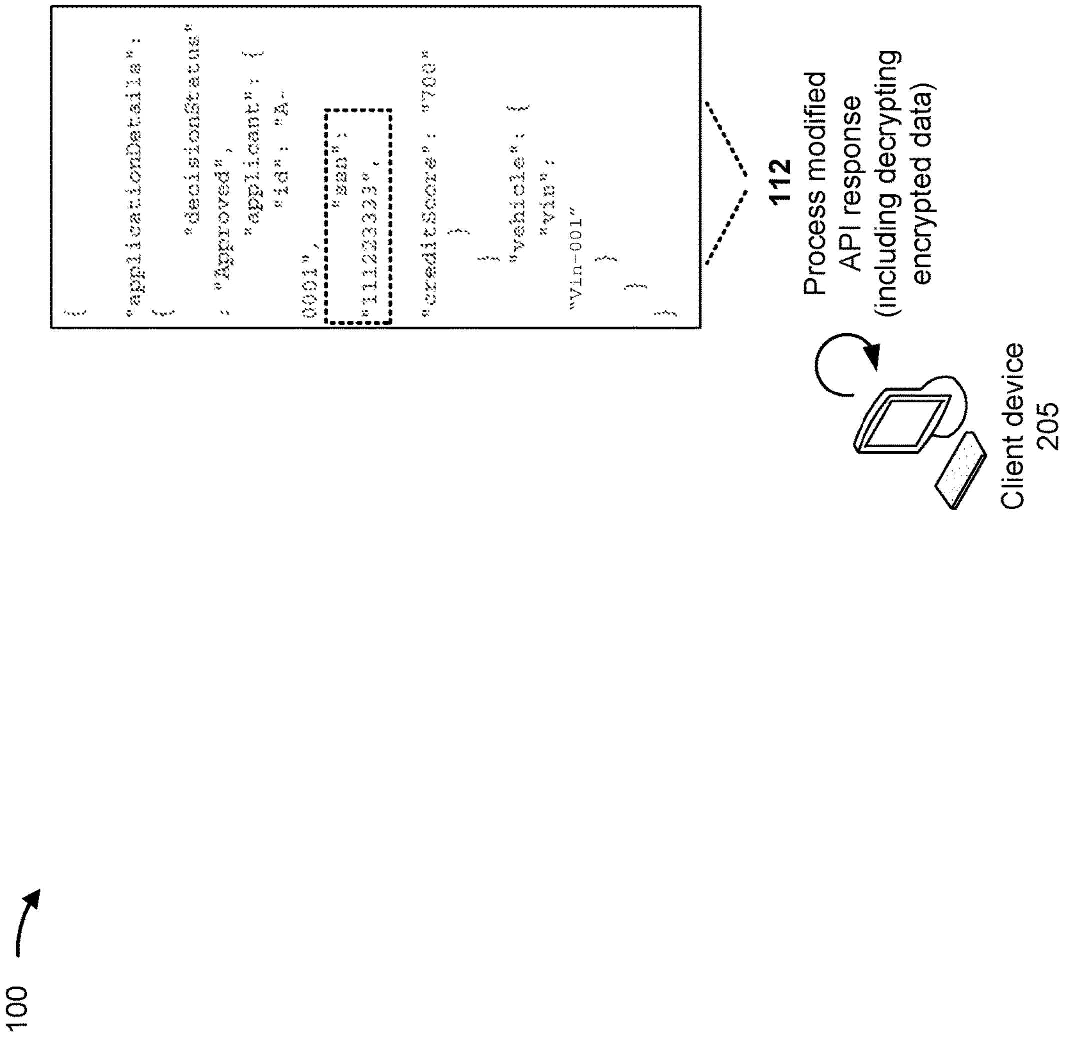

FIGS. 1A-1C are diagrams of an example 100 associated with generating a modified API response including a modified pointer associated with an encrypted value. As shown in FIGS. 1A-1C, example 100 includes a client device 205, a first service application device 210 (e.g., service application device 210-1), and a second service application device 210 (e.g., service application device 210-2). These devices are described in more detail in connection with FIGS. 2 and 3.

As shown in FIG. 1A at reference 102, the client device 205 may transmit, and the first service application device 210 may receive, an API request. In some implementations, the API request is a message including a request associated with retrieval of data or execution of an action at an API. For example, the first service application device 210 may be configured with a first API. In this example, the client device 205 may transmit an API request including a request to provide particular data (i.e., one or more particular items of information). In example 100, the API request includes a request for details associated with a particular loan application associated with a particular application identifier (e.g., APP-123).

As shown at reference 104, the first service application device 210 may transmit, and the second service application device 210 may receive, the API request. For example, the second service application device 210 may be configured with a second API. In this example, the client device 205 may transmit the API request including the request for to provide the particular data. As noted above, in example 100, the API request includes the request for the details associated with the particular loan application associated with the particular application identifier (e.g., APP-123).

In some implementations, as shown in example 100, the first service application device 210 may forward the API request received from the client device 205 (e.g., without modification). Alternatively, the first service application device 210 may modify the API request to create a modified API request (e.g., such that the modified API request conforms with a requirement of the second API), and may transmit the modified API request. Alternatively, the first service application device 210 may generate another API based on the API request (e.g., a new API request that conforms with a requirement of the second API).

As shown in FIG. 1B at reference 106, the second service application device 210 may transmit, and the first service application device 210 may receive, an API response associated with the API request. In some implementations, the API response is a message including a response to the API request. For example, the API response may include data responsive to the API request.

In some implementations, the second service application device 210 generates the API response based on the API request. For example, the second service application device 210 may receive the API request and retrieve the data responsive to the API request (e.g., from a database associated with the second service application device 210). In some implementations, the second service application device 210 may encrypt one or more portions of the data (e.g., using a key configured using an applicable key agreement protocol) to create one or more encrypted values (e.g., one or more hash values). The second service application device 210 may then generate an API response including a response body with one or more fields carrying one or more respective encrypted values and/or one or more fields carrying respective portions of the data that are not encrypted. Thus, in some implementations, the API response may include one or more encrypted values and one or more unencrypted values, where each value is carried in a different field of the response body of the API response.

In some implementations, the API response includes a pointer associating an encrypted value with a field in the response body of the API response. That is, the API response may include a pointer that points an encrypted value to a field in the response body that is associated with the encrypted value. In some implementations, the API response may include a key associated with decryption of encrypted values included in the API response. As an example, the key may be an encrypted value that can be used by a decryption tool (e.g., at the client device 205) to determine whether other encrypted values in the API response can be decrypted. In some implementations, the API response may include one or more other items of encryption metadata (e.g., in addition to a key, one or more pointers, and one or more encrypted values).

In example 100, the API response received by the first service application device 210 from the second service application device 210 includes encryption metadata comprising (1) a first pointer (e.g., "encrypted.applicant.name") associating a first encrypted value (< "encrypted hash>") with a first field (e.g., "name": " ") in the response body of the API response, (2) a second pointer (e.g., "encrypted.applicant.dob") associating a second encrypted value (e.g., < "encrypted hash>") with a second field (e.g., "dob": " ") in the response body of the API response, and (3) a third pointer (e.g., "encrypted.applicant.ssn") associating a third encrypted value (e.g., < "encrypted hash>") with a third field (e.g., "ssn": " ") in the response body of the API response. As further shown the encryption metadata in example 100 comprises a key associated with decryption of the encrypted values in the API response (e.g., "key.myKey": "<key to encrypt or decrypt>"). Further, in example 100, the API response includes a group of unencrypted values in other fields in the response body of the API response, namely an applicant identifier (e.g., "id": "A-0001"), an applicant credit score (e.g., "creditScore": "700"), and application location information (e.g., "location": {"city": "Dallas", "state": "TX", "zip": "00000"}).

As shown at reference 108, the first service application device 210 may generate, based on the API response, a modified API response associated with the API request. In some implementations, the modified API response includes an encrypted value (e.g., an encrypted value included in the API response) and a modified pointer that associates the encrypted value with a field in a response body of the modified API response. For example, the first service application device 210 (e.g., the API associated with the first service application device 210) may be configured to present the data responsive to the API request in a manner differently than that in which the data is presented in the API response received from the second service application device 210 (e.g., by the API associated with the second service application device 210). In such a scenario, the first service application device 210 may generate a modified API response so as to present the data in the desired manner. In some implementations, the modified pointer is modified relative to a corresponding pointer in the API response, and associates the same encrypted value (e.g., the same encrypted value carried in the API response) with a field in a response body of the modified API response.

In example 100, the modified API response generated by the first service application device 210 includes encryption metadata comprising a modified pointer (e.g., "encrypted.applicationDetails.ssn"). The modified pointer associates an encrypted value (< "encrypted hash>") with a particular field (e.g., "ssn": " ") in the response body of the modified API response. Here, the encrypted value is the same encrypted value (e.g., the same encrypted "ssn" value that was included in the API response). Thus, the modified pointer (e.g., modified relative to the corresponding pointer in the API response-"encrypted.applicant.ssn") in effect remaps the encrypted value to a different field in the modified API response. In some implementations, the first service application device 210 may remap one or more other encrypted values in a similar manner. Thus, in some implementations, the modified API response may include a second encrypted value and a second modified pointer, with the second modified pointer associating the second encrypted value with a second field in the response body of the modified API response. Notably, the first service application device 210 does not decrypt the encrypted value in association with remapping the encrypted value. As a result, data security is increased and resource consumption and latency are reduced (e.g., as compared to decrypting and re-encrypting the encrypted value in association with generating the modified API response).

As further shown, the encryption metadata in the modified API response comprises the key associated with decryption of the encrypted values in the API response (e.g., "key.myKey": "<key to encrypt or decrypt>"), which is the same key that is included in the API response. Further, in example 100, the API response includes a group of unencrypted values in other fields in the response body of the modified API response, namely application detail information that includes a decision status (e.g., "decision status": "Approved"), applicant information (e.g., "applicant": {"id": "A-0001", "creditScore": "700"}, and vehicle information (e.g., "vin": "Vin-001'). In some implementations, as illustrated in example 100, the modified API response includes a field carrying an unencrypted value that is also included in a field of the API response (e.g., the API response and the modified API response both include the same unencrypted value in the respective "id" fields and the same unencrypted value in the respective "creditScore" fields).

In some implementations, the modified API response does not include one or more items of information that are included in the API response. For example, in example 100, the API response includes the first pointer (e.g., "encrypted.applicant.name") and a first encrypted value (< "encrypted hash>"), the second pointer (e.g., "encrypted.applicant.dob") and the second encrypted value (e.g., < "encrypted hash>"), and unencrypted application location information (e.g., "location": {"city": "Dallas", "state": "TX", "zip": "00000"}). However, the modified API response does not include any of these items of information. Thus, in some implementations, the first service application device 210 may generate the modified API response so as to omit one or more items of information (e.g., data that the first service application device 210 does not need to present to the client device 205). In some implementations, the one or more items of information omitted from the modified API response may include one or more encrypted values. Thus, in some implementations, the modified API response does not include one or more encrypted values or one or more associated pointers that are included in the modified API response. Additionally, or alternatively, the one or more items of information omitted from the modified API response may include one or more unencrypted values. In this way, the modified API response can be generated so as to reduce a size of a payload of the modified API response (e.g., as compared to the API response), thereby reducing consumption of network resources (e.g., bandwidth) need to communicate the modified API response.

In some implementations, the modified API response includes one or more items of information that are not included in the API response. That is, in some implementations, the first service application device 210 may generate the modified API response so as to include data that is not included in the API response. For example, in example 100, the modified API response includes a decision status (e.g., "decision status": "Approved") and vehicle information (e.g., "vin": "Vin-001") that is not included in the API response. In some implementations, the first service application device 210 may obtain the values added to the modified API response based on retrieving additional data from storage (e.g., from a database accessible to the first service application device 210). Additionally, or alternatively, the first service application device 210 may obtain the values added to the modified API response based on receiving another API response (e.g., an API response received from another service application device 210 to which the first service application device 210 forwarded the API request). In some implementations, the one or more values added to the modified API response may include one or more encrypted values and one or more respective pointers that are received in a second API response (e.g., from another service application device 210). Additionally, or alternatively, the one or more items of information added to the modified API response may include one or more unencrypted values that are received in a second API response.

As shown at reference 110, the first service application device 210 may transmit, and the client device 205 may receive, the modified API response.

As shown in FIG. 1C at reference 112, the client device 205 may process the modified API response. For example, as shown in FIG. 1C, the client device 205 may receive the modified API response, may obtain various unencrypted values from fields of the modified API response, and may decrypt the encrypted value included in the modified API response using a key (e.g., a key configured using an applicable key agreement protocol). In example 100, the client device 205 processes the modified API response to obtain data from the various fields in the response body of the modified API response, and decrypts the encrypted value to obtain a decrypted value (e.g., "ssn": "111222333") from the response body of the modified API response.

In this way, resource used at the first service application device in association with providing an API response to the client device 205 is reduced, while allowing the first service application device 210 to present requested data to the client device 205 in a desired manner without a need for data decryption or re-encryption. As a result, data security is improved and resource consumption and latency at the first service application device 210 are reduced. Here, the field-level differentiation of encrypted data and unencrypted data in an API response enables remapping and full control of sensitive data (e.g., encrypted data) versus non-sensitive data (e.g., unencrypted data).

As indicated above, FIGS. 1A-1C are provided as an example. Other examples may differ from what is described with regard to FIGS. 1A-1C. For example, example 100 illustrates an example comprising a client device 205, a first service application device 210, and a second service application device 210. Notably, the techniques and apparatuses described herein can be extended to any number (e.g., more than two) service application devices 210. That is, an $N^{th}$ service application device 210 may receive an API request from an (N−1)th service application device 210, and may provide an API response to the (N−1)th service application device 210. The (N−1)th service application device 210 may generate a first modified API response based on the API response, and may provide the first modified API response to an (N−2)th service application device 210. The (N−2)th service application device 210 may generate a second modified API response based on the first modified API response, and may provide the second modified API response to an (N−3)th service application device 210, and so on, until some modified API response reaches the client device 205. As another example, as indicated above, a given service application device 210 may receive multiple API responses from respective service application devices 210, and may generate a modified API response based on the multiple API responses (e.g., such that the multiple API responses are combined in a single modified API response).

Figure 2:
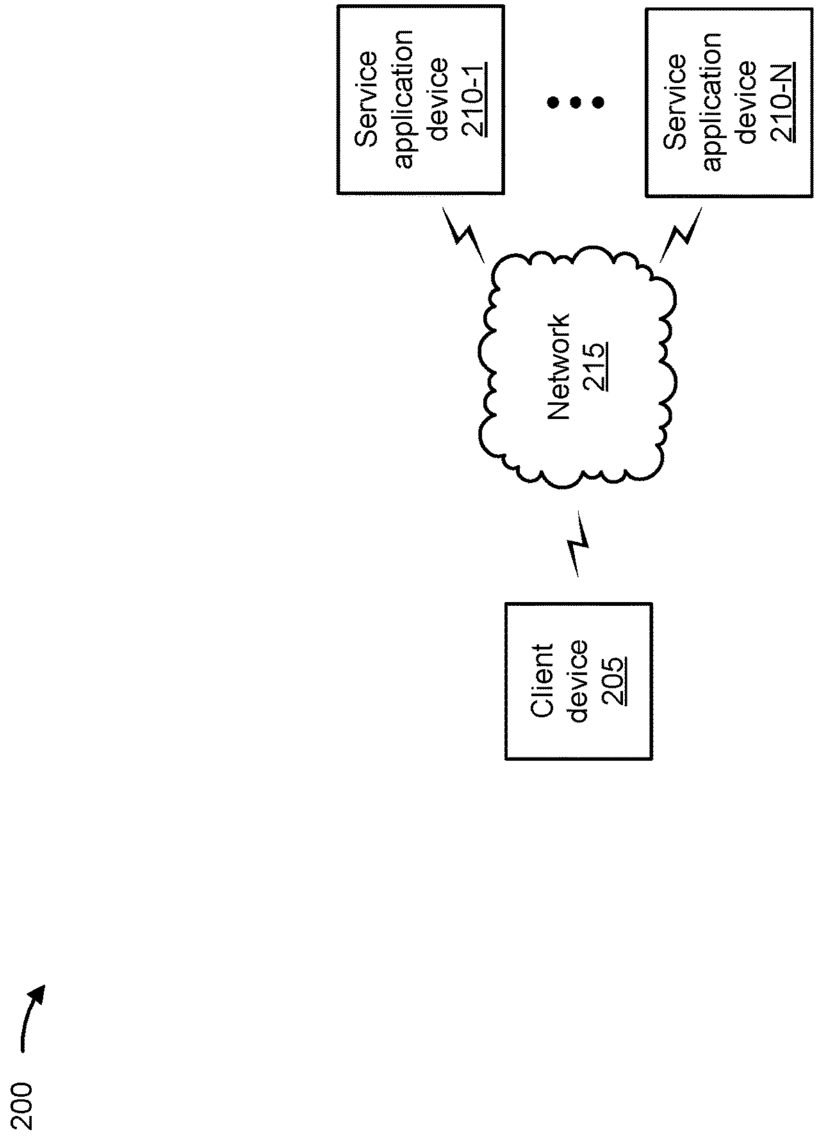
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a client device 205, a group of service application devices 210-1 through 210-N (N>1), and a network 215. Devices of environment 200 may interconnect via wired connections, wireless connections, or a combination of wired and wireless connections.

The client device 205 may include one or more devices capable of receiving, generating, storing, processing, and/or providing information associated with generating a modified API response including a modified pointer associated with an encrypted value, as described elsewhere herein. The client device 205 may include a communication device and/or a computing device. For example, the client device 205 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The service application device 210 may include one or more devices capable of receiving, generating, storing, processing, providing, and/or routing information associated with generating a modified API response including a modified pointer associated with an encrypted value, as described elsewhere herein. The service application device 210 may include a communication device and/or a computing device. For example, the service application device 210 may include a server, such as an application server, a client server, a web server, a database server, a host server, a proxy server, a virtual server (e.g., executing on computing hardware), or a server in a cloud computing system. In some implementations, the service application device 210 may include computing hardware used in a cloud computing environment.

The network 215 may include one or more wired and/or wireless networks. For example, the network 215 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 215 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
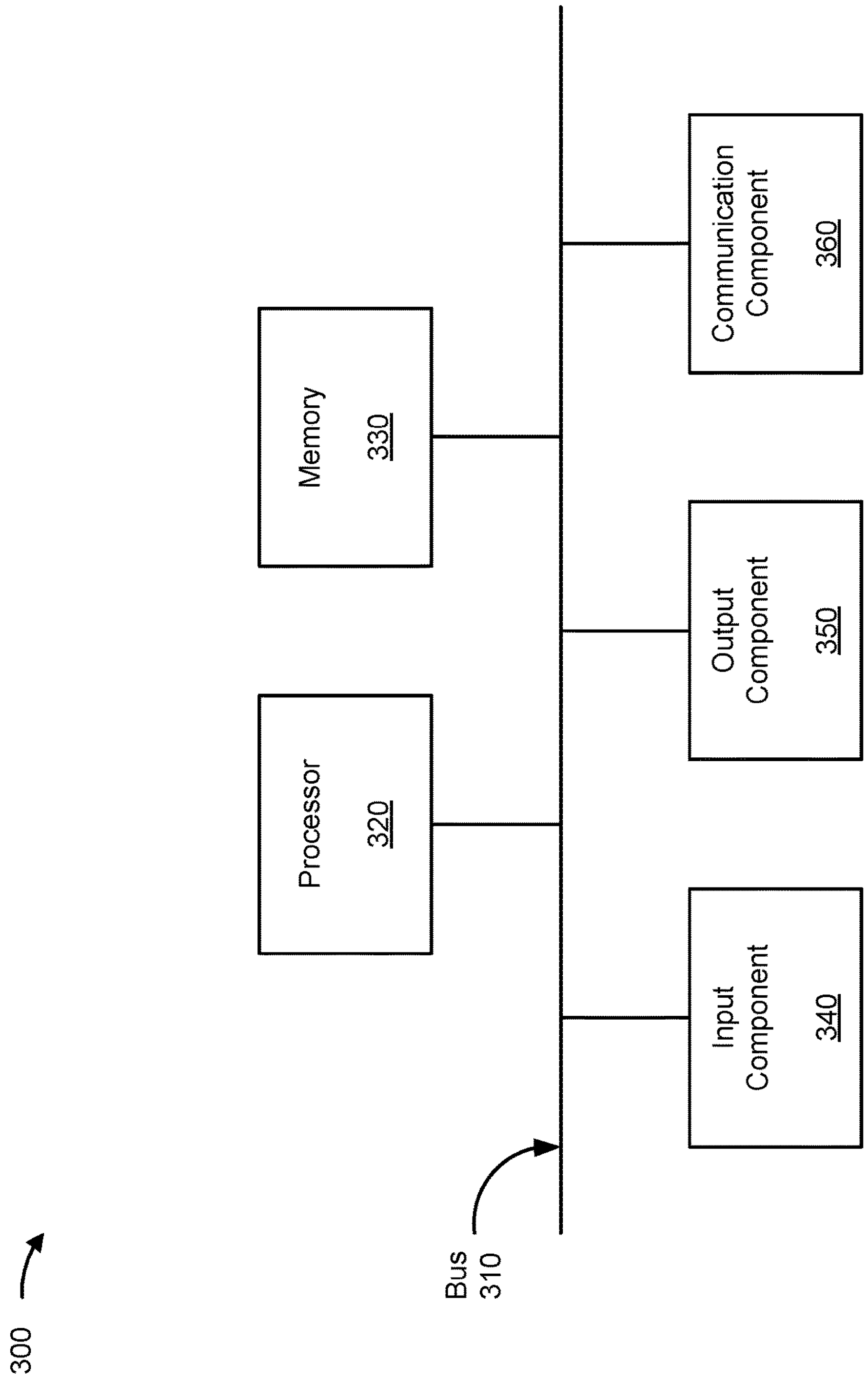
FIG. 3 is a diagram of example components of a device associated with generating a modified API response including a modified pointer associated with an encrypted value, in accordance with some embodiments of the present disclosure.

FIG. 3 is a diagram of example components of a device 300 associated with generating a modified API response including a modified pointer associated with an encrypted value. The device 300 may correspond to a client device 205 and/or a service application device 210. In some implementations, a client device 205 and/or a service application device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
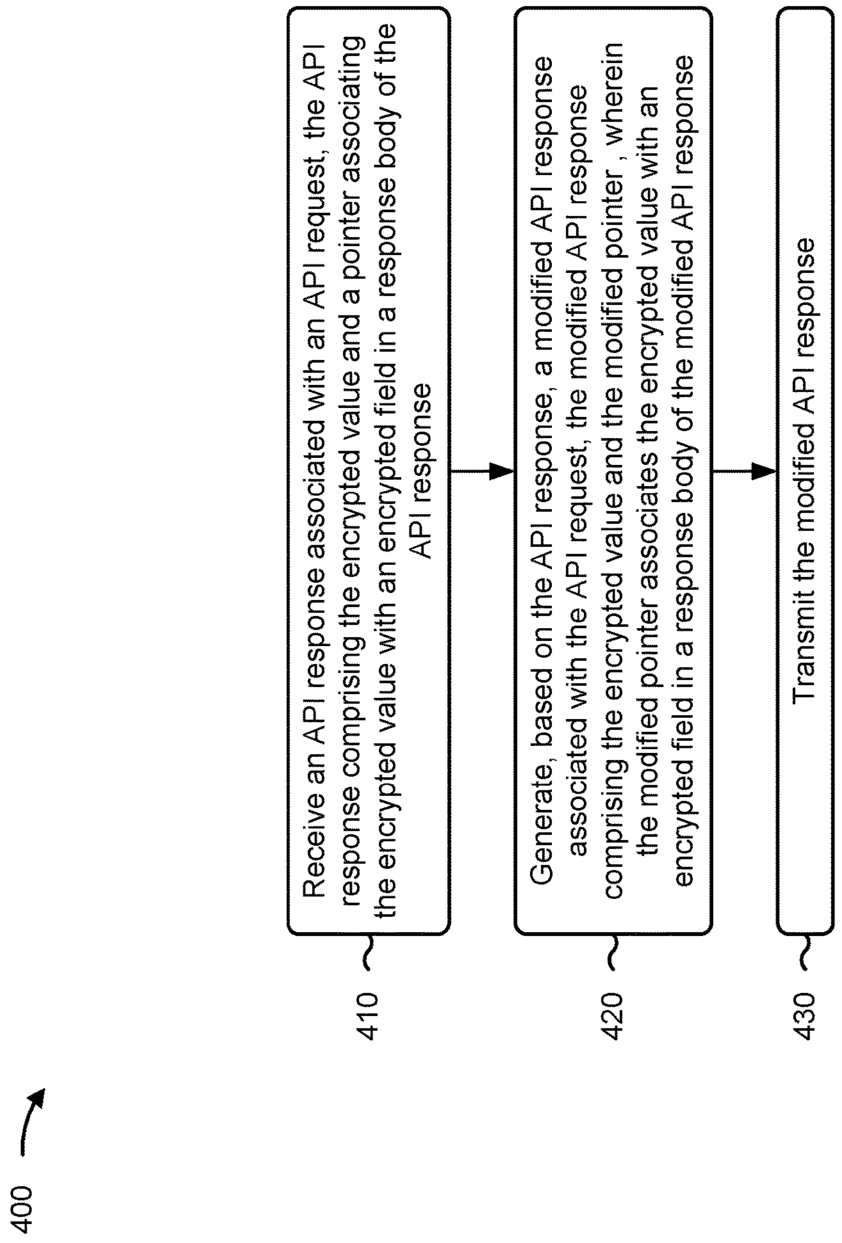
FIG. 4 is a flowchart of an example process associated with generating a modified API response including a modified pointer associated with an encrypted value, in accordance with some embodiments of the present disclosure.

FIG. 4 is a flowchart of an example process 400 associated with generating a modified API response including a modified pointer associated with an encrypted value. In some implementations, one or more process blocks of FIG. 4 may be performed by the service application device 210. In some implementations, one or more process blocks of FIG. 4 may be performed by another device or a group of devices separate from or including the service application device 210, such as the client device 205. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving an API response associated with an API request, the API response comprising the encrypted value and a pointer associating the encrypted value with a field in a response body of the API response (block 410). For example, the service application device 210 (e.g., using processor 320, memory 330, input component 340, and/or communication component 360) may receive an API response associated with an API request, the API response comprising the encrypted value and a pointer associating the encrypted value with a field in a response body of the API response, as described above in connection with reference 106 of FIG. 1B. As an example, an API response received by a first service application device 210 may include encryption metadata comprising (1) a first pointer (e.g., "encrypted.applicant.name") associating a first encrypted value (< "encrypted hash>") with a first field (e.g., "name": " ") in the response body of the API response, (2) a second pointer (e.g., "encrypted.applicant.dob") associating a second encrypted value (e.g., < "encrypted hash>") with a second field (e.g., "dob": " ") in the response body of the API response, and (3) a third pointer (e.g., "encrypted.applicant.ssn") associating a third encrypted value (e.g., < "encrypted hash>") with a third field (e.g., "ssn": " ") in the response body of the API response.

As further shown in FIG. 4, process 400 may include generating, based on the API response, a modified API response associated with the API request, the modified API response comprising the encrypted value and the modified pointer (block 420). For example, the service application device 210 (e.g., using processor 320 and/or memory 330) may generate, based on the API response, a modified API response associated with the API request, the modified API response comprising the encrypted value and the modified pointer, as described above in connection with reference 108 of FIG. 1B. In some implementations, the modified pointer associates the encrypted value with a field in a response body of the modified API response. As an example, the modified API response generated by the service application device 210 may include encryption metadata comprising a modified pointer (e.g., “encrypted.applicationDetails.ssn”) that associates an encrypted value (< “encrypted hash>”) with a particular field (e.g., “ssn”: “ ”) in a response body of the modified API response. Here, the encrypted value is the same encrypted value (e.g., the same encrypted “ssn” value that was included in the API response). Thus, the modified pointer in effect remaps the encrypted value to a different field in the modified API response.

As further shown in FIG. 4, process 400 may include transmitting the modified API response (block 430). For example, the service application device 210 (e.g., using processor 320, memory 330, and/or communication component 360) may transmit the modified API response, as described above in connection with reference 110 of FIG. 1B. As an example, the service application device 210 may provide the modified API response (e.g., including the modified pointer (e.g., “encrypted.applicationDetails.ssn”) that associates the encrypted value (< “encrypted hash>”) with the particular field (e.g., “ssn”: “ ”) in the response body of the modified API response.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to “at least one of” a list of items refers to any combination and permutation of those items, including single members. As an example, “at least one of: a, b, or c” is intended to cover a, b, c, a-b, a-c, b-c, and a-b-c, as well as any combination with multiple of the same item. As used herein, the term “and/or” used to connect items in a list refers to any combination and any permutation of those items, including single members (e.g., an individual item in the list). As an example, “a, b, and/or c” is intended to cover a, b, c, a-b, a-c, b-c, and a-b-c.

When “a processor” or “one or more processors” (or another device or component, such as “a controller” or “one or more controllers”) is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of “first processor” and “second processor” or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form “one or more processors configured to: perform X; perform Y; and perform Z,” that claim should be interpreted to mean “one or more processors configured to perform X; one or more (possibly different) processors configured to perform Y; and one or more (also possibly different) processors configured to perform Z.”

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A device for generating a modified application programming interface (API) response including a modified pointer associated with an encrypted value, the device comprising:

one or more memories; and one or more processors, communicatively coupled to the one or more memories, configured to:

receive an API response associated with an API request, the API response comprising the encrypted value and a pointer associating the encrypted value with a field in a response body of the API response;

generate, based on the API response, a modified API response associated with the API request, the modified API response comprising the encrypted value and the modified pointer, wherein the modified pointer is modified relative to the pointer in the API response and associates the encrypted value in the API response with a field in a response body of the modified API response, without decrypting and re-encrypting the encrypted value; and transmit the modified API response.

2. The device of claim 1, wherein the API response further comprises a second encrypted value and a second pointer associating the second encrypted value with a second field in the response body of the API response, and the modified API response further comprises the second encrypted value and a second modified pointer, wherein the second modified pointer associates the second encrypted value with a second field in the response body of the modified API response.

3. The device of claim 1, wherein the API response further comprises a second encrypted value and a second pointer associating the second encrypted value with a second field in the response body of the API response, and the modified API response does not include the second encrypted value or a pointer associated with the second encrypted value.

4. The device of claim 1, wherein the one or more processors are further configured to receive a second API response associated with the API request, the second API response comprising a second encrypted value and a second pointer associating the second encrypted value with a field in a response body of the second API response, wherein the modified API response further comprises the second encrypted value and a second modified pointer that associates the second encrypted value with a second field in the response body of the modified API response.

5. The device of claim 1, wherein the API response includes field carrying an unencrypted value in the response body of the API response and the modified API response includes a corresponding field carrying the unencrypted value in the response body of the modified API response.

6. The device of claim 1, wherein the API response and the modified API response include a key associated with decryption of the encrypted value.

7. The device of claim 1, wherein the device is a first service application device and the API response is received from a second service application device.

8. The device of claim 7, wherein the modified API response is transmitted for reception by a client device associated with the API request.

9. The device of claim 7, wherein the modified API response is transmitted for reception by a third service application device.

10. The device of claim 7, wherein the one or more processors are further configured to:

receive the API request, and forward the API request to the second service application device.

11. A method for generating a modified application programming interface (API) response, the method comprising:

receiving, by a device, a first API response associated with an API request, the first API response comprising an encrypted value and a first pointer associating the encrypted value with a field in the first API response;

generating, based on the first API response, a second API response associated with the API request, the second API response comprising the encrypted value and a second pointer that associates the encrypted value with a field in the second API response, wherein the second pointer is modified relative to the first pointer in the API response and associates the encrypted value in the first API response with a second field in a second response body of the second API response, without decrypting and re-encrypting the encrypted value, and wherein the second pointer is different from the first pointer; and transmitting, by the device, the second API response.

12. The method of claim 11, wherein the first API response further comprises another encrypted value and third pointer associating the other encrypted value with another field in the first API response, and the second API response further comprises the other encrypted value and a fourth pointer, wherein the fourth pointer associates the other encrypted value with another field in the second API response.

13. The method of claim 11, wherein the first API response further comprises another encrypted value and a third pointer associating the other encrypted value with another field in the first API response, and the second API response does not include the other encrypted value or a pointer associated with the other encrypted value.

14. The method of claim 11, further comprising receiving a third API response associated with the API request, the third API response comprising another encrypted value and a third pointer associating the other encrypted value with a field in the third API response, wherein the second API response further comprises the other encrypted value and a fourth pointer that associates the other encrypted value with another field in the second API response.

15. The method of claim 11, wherein the first API response includes a field carrying an unencrypted value and the second API response includes a corresponding field carrying the unencrypted value.

16. The method of claim 11, wherein the API response and the modified API response include a key associated with decryption of the encrypted value.

17. A non-transitory computer-readable medium storing a set of instructions, the set of instructions comprising:

one or more instructions that, when executed by one or more processors of a device, cause the device to:

receive an API response associated with an API request, the API response comprising a pointer that associates an encrypted value with a field in a response body of the API response; and transmit a modified API response associated with the API request, wherein the modified API response comprises a renamed pointer that associates the encrypted value with a field in a response body of the modified API response, wherein the renamed pointer is modified relative to the pointer in the API response and associates the encrypted value in the API response with a field in a response body of the modified API response, without decrypting and re-encrypting the encrypted value.

18. The non-transitory computer-readable medium of claim 17, wherein the API response further comprises a second pointer associating a second encrypted value with a second field in the response body of the API response, and the modified API response does not include a pointer associated with the second encrypted value.

19. The non-transitory computer-readable medium of claim 17, wherein the one or more instructions further cause the one or more processors to receive a second API response associated with the API request, the second API response comprising a second pointer associating a second encrypted value with a field in a response body of the second API response, wherein the modified API response further comprises a second renamed pointer that associates the second encrypted value with a second field in the response body of the modified API response.

20. The non-transitory computer-readable medium of claim 17, wherein the API response includes a field carrying an unencrypted value in the response body of the API response and the modified API response includes a corresponding field carrying an unencrypted value in the response body of the modified API response.

* * * * *